United States Patent [19]

Morris, Jr.

[11] 4,234,051
[45] Nov. 18, 1980

[54] DRIVER ALERTNESS DEVICE

[76] Inventor: Solon S. Morris, Jr., Rte. 1, Box 645, Smiths, Ala. 36877

[21] Appl. No.: 928,055

[22] Filed: Jul. 26, 1978

[51] Int. Cl.³ .................. B60K 31/00; B60K 28/00
[52] U.S. Cl. .................................. 180/272; 180/178; 340/575
[58] Field of Search ............. 180/99, 105 E, 109, 180/272, 178; 340/575, 576; 303/19, 20

[56] References Cited

U.S. PATENT DOCUMENTS

| | | | |
|---|---|---|---|
| 2,991,839 | 7/1961 | DeRemer | 180/99 |
| 3,285,368 | 11/1966 | Puri | 180/99 |
| 3,312,508 | 4/1967 | Keller et al. | 303/19 |
| 3,570,622 | 3/1971 | Wisner | 180/109 |
| 3,611,344 | 10/1971 | Couper | 180/99 |
| 3,778,116 | 12/1973 | Kennedy | 180/99 |
| 4,104,621 | 8/1978 | Yanagishima et al. | 180/99 |

Primary Examiner—David M. Mitchell
Attorney, Agent, or Firm—James B. Middleton

[57] ABSTRACT

A driver alertness device is disclosed. The device includes a timing counter that decrements from the time set towards zero. When the timer reaches zero, a solenoid is energized to urge the throttle to the idle position. A reset button is manually operable by the driver of the vehicle, a predetermined amount of time being added to the timer for each push of the reset button, and an on-/off switch is accessible to the driver.

7 Claims, 3 Drawing Figures

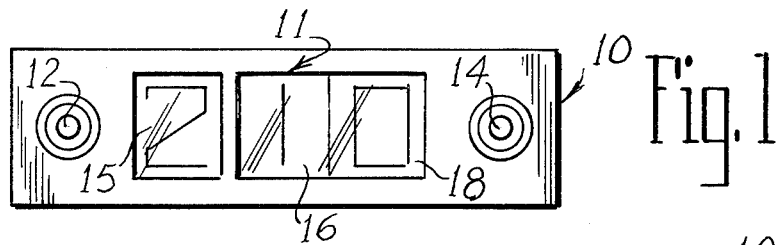
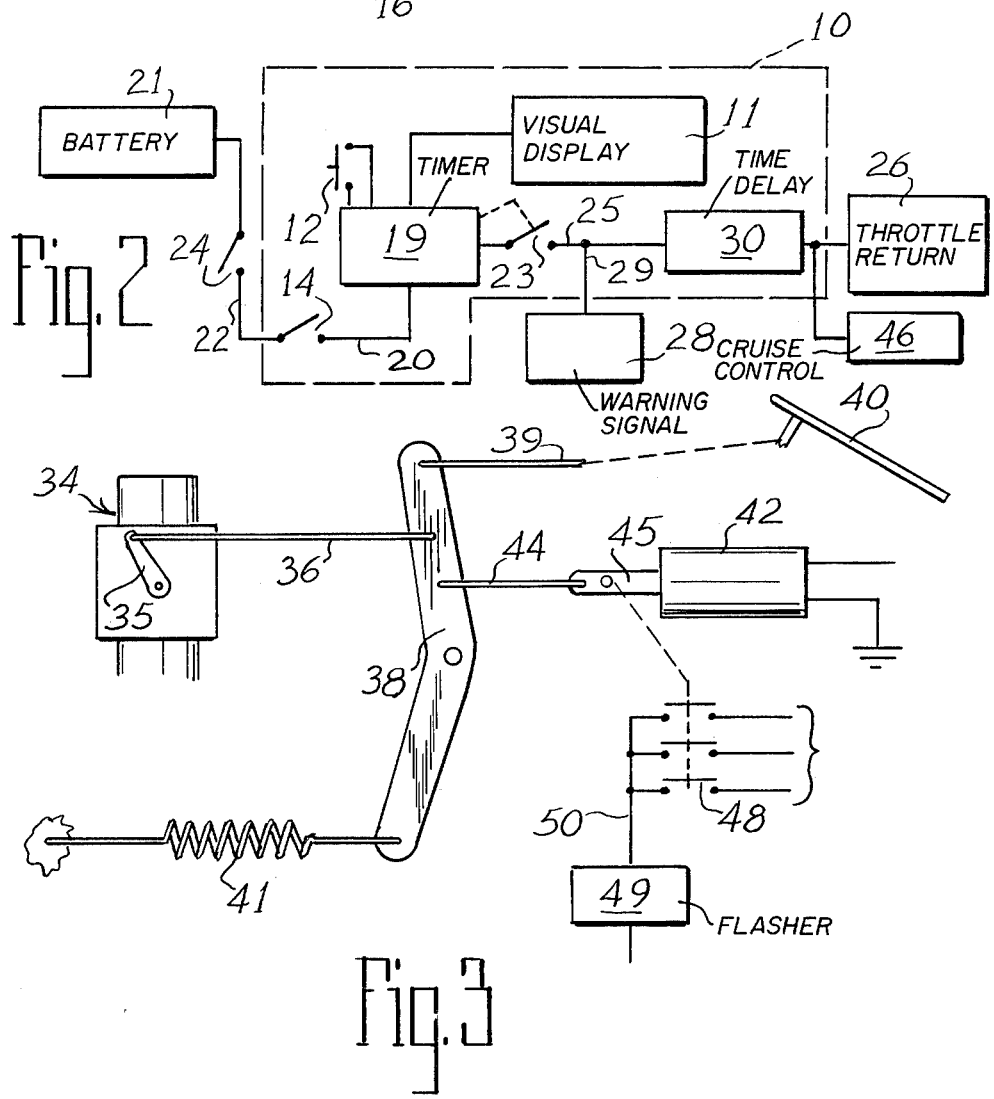

DRIVER ALERTNESS DEVICE

This invention relates generally to means for assuring safe operation of an automobile, and is more particularly concerned with apparatus to assure the alertness of an operator of a vehicle in order for the operator to continue to drive the vehicle.

When a person is operating a vehicle such as an automobile, one of the primarily hazardous conditions is the condition in which the driver is not alert. Failure of the driver to be alert and pay attention to proper operation of the vehicle is hazardous both to the driver and to other property and vehicles on the same road.

The prior art apparatus for preventing operation of a vehicle by a person who is not alert has generally taken the form of dexterity tests and the like electrically connected to the vehicle's starting system so that, if one is incapable of passing the dexterity tests, the vehicle cannot be started. While such apparatus may in fact prevent a person of insufficient dexterity from starting to drive an automobile, once the automobile is started, the prior art devices have no utility. As a result, the person can begin to drive an automobile while generally alert, and may continue to operate the vehicle after he has become so fatigued or otherwise incapacitated as to be truly incapable of operating an automobile safely.

One of the principal problems with a driver in driving an automobile or the like is the driving of long distances, and especially on good highways having multiple lanes and few curves so that the driving becomes extremely monotonous. When a person is fatigued from work, a long period of driving, or the like, such a long monotonous drive can cause the driver to become inattentive to his driving, and may cause him to become sufficiently drowsy that he may fall asleep while driving.

The present invention overcomes the above mentioned and other difficulties with the prior art by providing a decrementing counter that is resettable by the driver of a vehicle. If the decrementing counter reaches a predetermined level or quantity, the apparatus of the present invention will activate the vehicle's hazard warning or emergency flashers, and will reduce the vehicle's engine speed to an idle. In one embodiment of the invention, when the engine speed is reduced to an idle, the foot of the driver will receive a jolt, or shock, so that the driver will be brought back to awareness. It is also within the scope of the present invention that, once the decrementing counter reaches the predetermined level, the apparatus of the present invention will automatically deactivate a cruise control or other automatic speed control for the vehicle in order to reduce the engine speed to an idling speed. Thus, it will be seen that the present invention provides display means to be observed by the driver of a vehicle, and reset means that must be operated by the driver of the vehicle before the decrementing counter reaches the predetermined level as indicated by the display means. Failure of the driver to reset the counter before the counter reaches the predetermined level will result in activation of the vehicle's emergency flashers and the return of the engine to an idling speed so that the vehicle will be relatively safe for an inattentive driver.

These and other features and advantages of the present invention will become apparent from consideration of the following specification when taken in conjunction with the accompanying drawing in which:

FIG. 1 is a front elevational view showing one form of apparatus made in accordance with the present invention to be placed in the passenger compartment in a location convenient to the driver of the vehicle;

FIG. 2 is a block diagram showing a complete system constructed in accordance with the present invention; and, FIG. 3 is a somewhat schematic illustration showing the throttle return apparatus made in accordance with one embodiment of the present invention, and including one means for activating the emergency flashers of the vehicle.

Referring now more particularly to the drawing, and to that embodiment of the invention here chosen by way of illustration, in FIG. 1 it will be seen that there is a housing 10 which is to be placed in some location that is conveniently accessible to the driver of the vehicle. It is contemplated that the housing 10 would be placed on the dashboard in such a position that the driver will be able to view the numerals of the display without entirely removing his eyes from the road. Also, the driver should be able to reach the reset button 12 and the on-off switch 14.

As here illustrated, it will be seen that the display 11 includes a single location for minutes of time so that only one digit of minutes can be displayed. Two locations for seconds are provided so that the seconds can be displayed from zero to fifty-nine. While those skilled in the art will realize that two places may be used to display the minutes indication, it has been found that a maximum of nine minutes is desirable. When a driver is sleepy or fatigued, ten minutes is almost enough for the driver to fall asleep or to be so distracted that he completely loses control of the vehicle. While the minutes indication can indicate up to nine minutes, and in conjunction with the seconds indication of up to fifty-nine seconds is equal to ten minutes for practical purposes, a length of time greater than ten minutes cannot be placed on the timer as shown in the embodiment of the invention disclosed herein.

The purpose of the reset button 12 is to put more time on the timer to be indicated on the display 11. It will therefore be seen that, with the arrangement as shown in FIG. 1 of the drawing, as long as the driver is sufficiently aware of his surroundings that he can read the display 11 periodically, when the time indication becomes quite low, the driver can depress the reset button 12 and add time to the timer to be indicated on the display 11.

It is preferred that the on-off button 14 be located very conveniently to a driver so that the device can be completely turned off if necessary. For example, if an emergency situation arise wherein the driver needs to accelerate and the display 11 indicates almost no time remaining, the driver may simply depress the on-off button 14 to deactivate the entire apparatus and allow the automobile to respond to the usual controls. When things return to normal, the driver can depress the on-off button 14 again to reactivate the apparatus, and then can depress the reset button 12 the desired number of times to place some reasonable amount of time on the timer. It should also be realized that the timer herein discussed is a form of counter as contemplated by the present invention, and any other form of counter may be used so long as the counter can decrement as required.

For a better understanding of the construction of the entire apparatus of the present invention, attention is directed to FIG. 2 of the drawing. The housing 10 is indicated in broken lines in FIG. 2, and it will be seen that the display 11 is indicated as being within the housing 10, as well as a timer indicated at 19. The reset button 12 is connected to the timer 19, and the on-off button 14 is connected into the supply line 20 for the timer 19.

In more detail, it will be seen that the battery 21 or other electrical supply feeds the on-off switch 14 through a line 22 leading from the ignition switch 24. The timer 19 can be of virtually any style or design, the object being only to provide some resettable means that will decrement to zero or other predetermined quantity. Those skilled in the art will realize that such devices may easily be provided by electronic means, such as through a series of flip-flops. Furthermore, using a series of flip-flops with a basic timing pulse allows one to obtain a signal at many discrete time increments for control of various other devices such as the display 11 and the remaining apparatus for the present invention. Those skilled in the art will likewise understand that a mechanical timer or other counting apparatus having a plurality of cams with appropriate switches riding thereon will operate equally well. In the case of a mechanical timer or counter, the display 11 may also be mechanical, the point being only to provide a visual indication to a driver as the timer 19 decrements from some given quantity towards zero or other predetermined quantity.

The reset button 12 is preferably arranged to increase the given time on the timer 19 by a predetermined factor, such as by one minute. While longer times may be usable with the device, it has been found that greater attention is required, so greater stimulation is achieved, if the driver is required to reset the timer 19 reasonably frequently.

Once the timer 19 is allowed to decrement to zero or other predetermined quantity, the timer 19 closes the switch 23 in the line 25, and the line 25 branches to connect to a throttle return mechanism 26 and a warning signal 28. As here shown, the line 25 has a branch 29 which leads directly to the warning signal 28 so that as soon as the timer 19 reaches zero, the warning signal 28 will be activated. On the other hand, the line 25 continues to a time delay device 30, thence to the throttle return device 26. Though the time delay device 30 may or may not be used as desired, it is advantageous in some instances because the warning signal 28 requires a short time to activate, and the time delay device 30 is designed to delay the throttle return 26 until activation of the warning signal 28.

It is contemplated that the warning signal 28 will comprise the conventional emergency flasher on a vehicle. It will be readily understood by those skilled in the art that numerous other warning signals may equally well be used, and could in some instances be more readily visible than the conventional emergency flashers.

Attention is next directed to FIG. 3 of the drawing which discloses one form of mechanical apparatus as a throttle return mechanism 26, and including means for operating the warning signal 28. In FIG. 3 it will be seen that the carburetor of an engine is indicated at 34, and the throttle valve control arm is indicated at 35. There is a conventional linkage 36 extending from the arm 35 to a bell crank 38, and another linkage 39 extends from the bell crank 38, through conventional linkages not here illustrated, to the accelerator pedal 40. It will therefore be seen that one driving an automobile conventionally would depress the accelerator pedal 40 which would urge the linkage 39 to the left as viewed in FIG. 3 of the drawing, thereby causing the bell crank 38 to rotate in a counterclockwise direction, which will in turn urge the linkage 36 to the left as viewed in FIG. 3. This will rotate the arm 35 in a counterclockwise direction to open the throttle valve of the carburetor 34. Also as conventionally arranged, there is a return spring 41 connected to the opposite arm of the bell crank 38 in a manner to rotate the bell crank 38 in a clockwise direction. As will be understood by those skilled in the art, the return spring 41 returns the throttle valve of the carburetor 34 to an idle setting when pressure is removed from the accelerator pedal 40.

In accordance with the present invention, when the decrementing counter, or timer 19, reaches zero the engine should be placed at its idling speed. To achieve this, there is a solenoid 42 appropriately fixed in place and having a linkage 44 connected between the armature 45 and the bell crank 38. It will thus be seen that, when the solenoid 42 is energized so that the armature 45 moves into the solenoid 42, the linkage 44 will urge the bell crank 38 to rotate in a clockwise direction to return the throttle valve of the carburetor 34 to its nearly closed, or idling, position. Since the solenoid 42 will be suddenly energized, the return of the linkages to idle position will be rather sudden so that the accelerator pedal 40 will be somewhat jerked to its fully-up position.

One means for operating the conventional emergency flashers on an automobile is also shown in FIG. 3 of the drawing. It will be seen that there is a triple-pole-single-throw switch 48 which is operated by the armature 45 of the solenoid 42. Those skilled in the art will realize that the emergency flasher system on conventional vehicles utilizes an electrical flasher, or circuit interrupting device such as the device indicated at 49, and the intermittent power from the flasher 49 is fed to the various lights on the vehicle. In installing a device in accordance with the present invention, the power output from the flasher 49 on the wire 50 is connected to one side of all three of the poles on the switch 48. The opposite sides of the three poles os the switch 48 are connected into the existing lines going to the various lights. While in many cases there are three such lines going to the various lights, it will be obvious to those skilled in the art that a similar arrangement can be used in the event a different number of lines is required.

Considering the arrangement for the emergency flashers, it will be readily seen by those skilled in the art that such a system can be operated electronically simply by placing a transistor in lieu of each of the poles of the switch 48, and the line from the timer 19 can be arranged to trigger the transistors.

From the foregoing description, it should now be understood that the housing 10 would be placed adjacent to the driver, or operator, of a vehicle. As long as the on-off switch 14 is off, the timer 19 will not be energized and the vehicle will operate conventionally. When a driver finds that he is unusually fatigued, sleepy, or otherwise likely to become inattentive to the operation of the vehicle, the on-off switch 14 would be depressed to close the switch 14 and energize the timer 19. Simultaneously, the reset button 12 would be depressed so that some given quantity above the predetermined quantity would be indicated by the display 11, and the vehicle will again operate as is conventional.

However, once the apparatus is activated, the driver of the vehicle must periodically look at the display 11 to determine if there is still time left on the timer 19 as indicated by the display 11; that is to say, the driver must determine if the display 11 indicates a given quantity above the predetermined quantity at which the vehicle engine will be returned to an idle. When the driver determines that the device needs to be reset, the driver simply depresses the button 12 to add some time, and he may depress the button 12 a plurality of times to add a plurality of increments of time, or he may depress the button 12 only once to add only one increment of time. As long as the driver of the vehicle maintains the timer 19 at some quantity above the predetermined quantity, the vehicle will continue to operate as is conventional.

If the driver becomes inattentive to his driving, whether because of drowsyness, fatigue, or simply distractions within the vehicle, as the timer 19 decrements towards the predetermined quantity, if the driver is too inattentive to realize that the timer has decremented to the predetermined quantity, the switch 23 will be closed to energize the line 25, and the branch 29 so that the warning signal 28 will be activated. Also, the time delay 30 will be activated (if the time delay device is used in the embodiment on the vehicle) and, after the given length of time, the throttle return device 26 will be energized to return the engine to an idling speed. With the arrangement disclosed herein, it will also be understood that the activation of the throttle return mechanism will result in an upward jerking of the accelerator pedal 40 so that the driver of the vehicle will receive an upward thrust on his foot which may cause him to become attentive to his driving, at which time he can depress the button 12 to raise the quantity on the timer to some given quantity and the vehicle will continue to operate conventionally.

Since many vehicles are now provided with an electronically controlled speed control, commonly referred to as a cruise control, it will be understood that the line 25 can be directed to the cruise control 46 in stead of, or in addition to the throttle return mechanism 26. It is contemplated that, if the driver is using a cruise control 46, his foot will not be on the accelerator 40 so that the upward jerking of the pedal may be of no benefit. However, simply deactivating the cruise control 46 will narmally return the throttle valve in the carburetor 34 to its nearly closed, or idling position.

It will of course be understood by those skilled in the art that the particular embodiments of the invention here chosen are by way of illustration only, and are meant to be in no way restrictive; therefore, numerous changes and modifications may be made, and the full use of equivalents resorted to, without departing from the spirit or scope of the invention as defined in the appended claims.

I claim:

1. A driver alertness device, for a vehicle having a throttle, a linkage for positioning said throttle, said throttle having an idle position, said driver alertness device comprising counting means for decrementing from a given quantity towards a predetermined quantity, said predetermined quantity being lower than said given quantity, display means for displaying said given quantity and all decremented quantities in readable form, reset means for increasing the quantity of said counting means, said reset means comprising a button selectively operable by said driver for increasing the quantity by a predetermined increment or in multiple increments for selectively establishing a given quantity, switch means operable by said counting means when said counting means reaches said predetermined quantity, and throttle return means for placing said throttle at said idle position in response to the closing of said switch means.

2. A driver alertness device as claimed in claim 1, said vehicle further including an emergency warning system, said driver alertness device including means for activating said emergency warning system in response to the closing of said switch means.

3. A driver alertness device as claimed in claim 2, said vehicle further including cruise control means for maintaining said vehicle at a constant speed, said driver alertness device including means for deactivating said cruise control means in response to the closing of said switch means.

4. A driver alertness device as claimed in claim 2, said throttle return means including a solenoid having an armature, means connecting said armature to said linkage for positioning said throttle such that said throttle is placed in idle position when said solenoid is energized.

5. A driver alertness device as claimed in claim 4, said vehicle further including an accelerator pedal for operating said linkage for positioning said throttle, said solenoid being so constructed and arranged that energization of said solenoid moves said linkage for positioning said throttle and said accelerator pedal.

6. A driver alertness device as claimed in claim 5, and further including time delay means for delaying operation of said throttle return means after closing said switch means.

7. A driver alertness device as claimed in claim 6, and further including second switch means for disabling said driver alertness device, said second switch means being accessibly located with respect to said driver.

* * * * *